United States Patent
Kahlig et al.

(10) Patent No.: US 11,738,790 B2
(45) Date of Patent: Aug. 29, 2023

(54) WHEEL GUARD

(71) Applicant: Crown Equipment Corporation, New Bremen, OH (US)

(72) Inventors: Daniel Kahlig, Fort Recovery, OH (US); Liming Yue, New Bremen, OH (US); Daniel Magoto, Russia, OH (US)

(73) Assignee: Crown Equipment Corporation, New Bremen, OH (US)

( * ) Notice: Subject to any disclaimer, the term of this patent is extended or adjusted under 35 U.S.C. 154(b) by 45 days.

(21) Appl. No.: 17/197,446

(22) Filed: Mar. 10, 2021

(65) Prior Publication Data

US 2021/0284220 A1  Sep. 16, 2021

Related U.S. Application Data

(60) Provisional application No. 62/987,774, filed on Mar. 10, 2020.

(51) Int. Cl.
| | |
|---|---|
| *B62B 5/06* | (2006.01) |
| *B62B 5/00* | (2006.01) |
| *B66F 9/075* | (2006.01) |

(52) U.S. Cl.
CPC ............. *B62B 5/0009* (2013.01); *B62B 5/06* (2013.01); *B66F 9/075* (2013.01)

(58) Field of Classification Search
CPC .. B62D 25/161; B62D 25/163; B62D 25/168; B62B 5/0006; B62B 5/0009; B66F 9/075
See application file for complete search history.

(56) References Cited

U.S. PATENT DOCUMENTS

| | | | | |
|---|---|---|---|---|
| 2,016,833 | A | | 10/1935 | Lloyd |
| 2,450,062 | A | * | 9/1948 | Voss ........................ B60B 33/00 |
| | | | | 280/160 |
| 3,036,651 | A | * | 5/1962 | Paul ...................... B62B 3/0612 |
| | | | | 280/43.12 |
| 3,432,183 | A | | 3/1969 | Groll |
| 3,560,021 | A | * | 2/1971 | Watson ................ B62D 25/188 |
| | | | | 298/1 SG |

(Continued)

FOREIGN PATENT DOCUMENTS

| | | |
|---|---|---|
| CN | 2293492 Y | 10/1998 |
| DE | 2839344 A1 | 3/1980 |

(Continued)

OTHER PUBLICATIONS

Pages from Crown GPW Service & Parts Manual; Jun. 26, 1992.
Images from Crown GPW Pallet Truck; 1999.

*Primary Examiner* — Jeffrey J Restifo
(74) *Attorney, Agent, or Firm* — Stevens & Showalter LLP

(57) ABSTRACT

A wheel guard is provided for use on a material handling vehicle comprising a steering assembly, an axle extending through the steering assembly and a steer wheel mounted on the axle. The wheel guard may comprise: a front plate to be positioned adjacent to the steer wheel; an axle support coupled to and extending transverse to the front plate and comprising an axle aperture through which the vehicle axle is to be extended, the wheel guard to be rotatable about the axle; and a stop coupled to at least one of the front plate or the axle support to limit rotational movement of the wheel guard about the axle.

21 Claims, 7 Drawing Sheets

(56) References Cited

U.S. PATENT DOCUMENTS

| | | | |
|---|---|---|---|
| 3,799,579 A * | 3/1974 | Dahl | A01D 34/828 56/17.4 |
| 4,026,378 A | 5/1977 | DePriester | |
| 4,027,771 A * | 6/1977 | Adams | B62B 3/0625 280/43.12 |
| 4,780,041 A | 10/1988 | Ashby | |
| 4,996,832 A * | 3/1991 | McKeever | A01D 34/828 56/320.1 |
| 5,026,079 A * | 6/1991 | Donze | B62B 1/20 280/47.33 |
| 5,113,960 A * | 5/1992 | Prinz | B66F 9/07559 280/43.12 |
| 5,403,026 A | 4/1995 | Dahl | |
| 5,752,584 A | 5/1998 | Magoto et al. | |
| 6,260,646 B1 * | 7/2001 | Fernandez | B62B 3/0612 280/43.23 |
| 7,267,349 B2 * | 9/2007 | Sica | B60G 3/185 187/222 |
| 7,568,708 B2 * | 8/2009 | Vietri, Jr. | B62B 5/0006 280/43.12 |
| 10,850,759 B2 * | 12/2020 | Loveless | B62B 5/0006 |
| 2004/0188965 A1 * | 9/2004 | Feick | B62B 5/0006 280/47.131 |
| 2005/0001454 A1 | 1/2005 | Rush et al. | |
| 2005/0241889 A1 * | 11/2005 | Nebolon | B62B 3/14 188/19 |
| 2006/0108765 A1 | 5/2006 | Teich | |
| 2008/0079228 A1 | 4/2008 | Rye et al. | |
| 2008/0122253 A1 * | 5/2008 | Knie | B66F 9/07527 296/181.1 |
| 2008/0164668 A1 * | 7/2008 | Feick | B62B 1/20 280/47.31 |
| 2008/0197589 A1 * | 8/2008 | Vietri | B62B 3/06 280/43.12 |
| 2017/0282947 A1 * | 10/2017 | Meyer | B62B 1/186 |
| 2019/0300037 A1 * | 10/2019 | Loveless | B62B 3/06 |
| 2020/0385041 A1 * | 12/2020 | Jiang | B62B 5/004 |
| 2021/0284220 A1 * | 9/2021 | Kahlig | B62B 5/0009 |

FOREIGN PATENT DOCUMENTS

| | | |
|---|---|---|
| EP | 562485 A1 | 9/1993 |
| EP | 1077169 A2 | 2/2001 |
| FR | 2359737 A1 | 2/1978 |
| GB | 191422562 A | 10/1915 |
| GB | 139275 A | 3/1920 |
| GB | 184063 A | 8/1922 |
| GB | 239997 A | 9/1925 |
| GB | 406109 A | 2/1934 |
| GB | 2063794 A | 6/1981 |
| JP | S59153644 A | 9/1984 |
| JP | H10166968 A | 6/1998 |
| JP | H11170933 A | 6/1999 |

* cited by examiner

WHEEL GUARD

CROSS REFERENCE TO RELATED APPLICATION

This application claims the benefit of U.S. Provisional Patent Application Ser. No. 62/987,774, filed on Mar. 10, 2020, entitled "Wheel Guard," the disclosure of which is incorporated herein by reference.

BACKGROUND

Pallet trucks may be used to lift and transport loaded and unloaded pallets on a fork assembly. Pallet trucks typically employ a lift mechanism employing a hydraulic actuator, to raise the fork assembly from a lowered position, to provide sufficient clearance between a lower surface of the pallet and a floor to permit travel. Each fork of the fork assembly is supported by load wheels located near the ends of the forks. Travel is controlled by the pallet truck operator, typically by a steering assembly coupled to a tiller handle, which steering assembly is coupled to one or more steer wheels.

SUMMARY

In accordance with a first aspect of the disclosure, a wheel guard is provided for use on a material handling vehicle comprising a steering assembly, an axle extending through the steering assembly and a steer wheel mounted on the axle. The wheel guard may comprise: a front plate to be positioned adjacent to the steer wheel; an axle support coupled to and extending transverse to the front plate and comprising an axle aperture through which the vehicle axle is to be extended, the wheel guard to be rotatable about the axle; and a stop coupled to at least one of the front plate or the axle support to limit rotational movement of the wheel guard about the axle.

The axle support may comprise a first axle support and the wheel guard may further comprise a second axle support. The first and second axle supports may be spaced apart from one another and coupled to the front plate.

The wheel guard may further comprise a back support coupled to the first and second axle supports at locations on the first and second axle supports opposite to locations where the first and second axle supports are coupled to the front plate.

The stop may comprise a first stop coupled to the back support to limit rotational movement of the wheel guard about the vehicle axle in a first direction.

The wheel guard may further comprise a second stop coupled to at least one of the front plate or the first and second axle supports and spaced from the first stop. The second stop may limit rotational movement of the wheel guard about the vehicle axle in a second direction opposite to the first direction.

The first stop may have a first length and the second stop may have a second length. A gap between the first and second stops may have a length greater than the first length and less than the second length.

At least one of the first or the second stop may comprise a removable length adapter.

In accordance with a second aspect of the disclosure, a combination is provided comprising a material handling vehicle and a wheel guard. The material handling vehicle may comprise: a steering assembly; an axle extending through the steering assembly; and a steer wheel mounted on the axle. The wheel guard may comprise: a front plate located adjacent to the steer wheel; an axle support coupled to and extending transverse to the front plate and comprising an axle aperture through which the axle extends, the wheel guard being rotatable about the axle; and a stop coupled to at least one of the front plate or the axle support to limit rotational movement of the wheel guard about the axle.

The axle support may comprise a first axle support and the wheel guard may further comprise a second axle support. The first and second axle supports may be spaced apart from one another and coupled to the front plate.

The wheel guard may further comprise a back support coupled to the first and second axle supports at locations on the first and second axle supports opposite to locations where the first and second axle supports are coupled to the front plate.

The stop may comprise a first stop coupled to the back support and limit rotational movement of the wheel guard about the vehicle axle in a first direction.

The wheel guard may further comprise a second stop coupled to at least one of the front plate or the first and second axle supports and be spaced from the first stop. The second stop may limit rotational movement of the wheel guard about the vehicle axle in a second direction opposite to the first direction.

The first stop may have a first length and the second stop may have a second length. A gap between the first and second stops may have a length greater than the first length and less than the second length.

At least one of the first or the second stop may comprise a removable length adapter.

The steer wheel may comprise a first steer wheel and the vehicle may further comprise a second steer wheel. The first and second steer wheels may be spaced apart on the axle.

A width of the front plate may be equal to or less than a width of the first and second steer wheels extending from an outer edge of the first steer wheel to an outer edge of the second steer wheel.

In accordance with a third aspect of the disclosure, a wheel guard is provided for use on a material handling vehicle comprising a steering assembly, an axle extending through the steering assembly and first and second steer wheels mounted on the axle. The wheel guard may comprise: a front plate to be positioned adjacent to the steer wheel; and an axle support coupled to and extending transverse to the front plate and comprising an axle aperture through which the vehicle axle is to be extended. A width of the front plate may be equal to or less than a width of the first and second steer wheels extending from an outer edge of the first steer wheel to an outer edge of the second steer wheel.

BRIEF DESCRIPTION OF THE DRAWINGS

The embodiments set forth in the drawings are illustrative and not intended to limit the subject matter defined by the claims. The following detailed description of the illustrative embodiments can be understood when read in conjunction with the following drawings, where like structure is indicated with like reference numerals and in which:

DETAILED DESCRIPTION

The following text sets forth a broad description of numerous different embodiments of the present disclosure. The description is to be construed as exemplary only and does not describe every possible embodiment since describing every possible embodiment would be impractical, if not impossible, and it will be understood that any feature, characteristic, component, composition, ingredient, product, step or methodology described herein can be deleted, combined with or substituted for, in whole or part, any other feature, characteristic, component, composition, ingredient, product, step or methodology described herein. It should be understood that multiple combinations of the embodiments described and shown are contemplated and that a particular focus on one embodiment does not preclude its inclusion in a combination of other described embodiments. Numerous alternative embodiments could also be implemented, using either current technology or technology developed after the filing date of this patent, which would still fall within the scope of the claims. All publications and patents cited herein are incorporated herein by reference.

Figure 1:
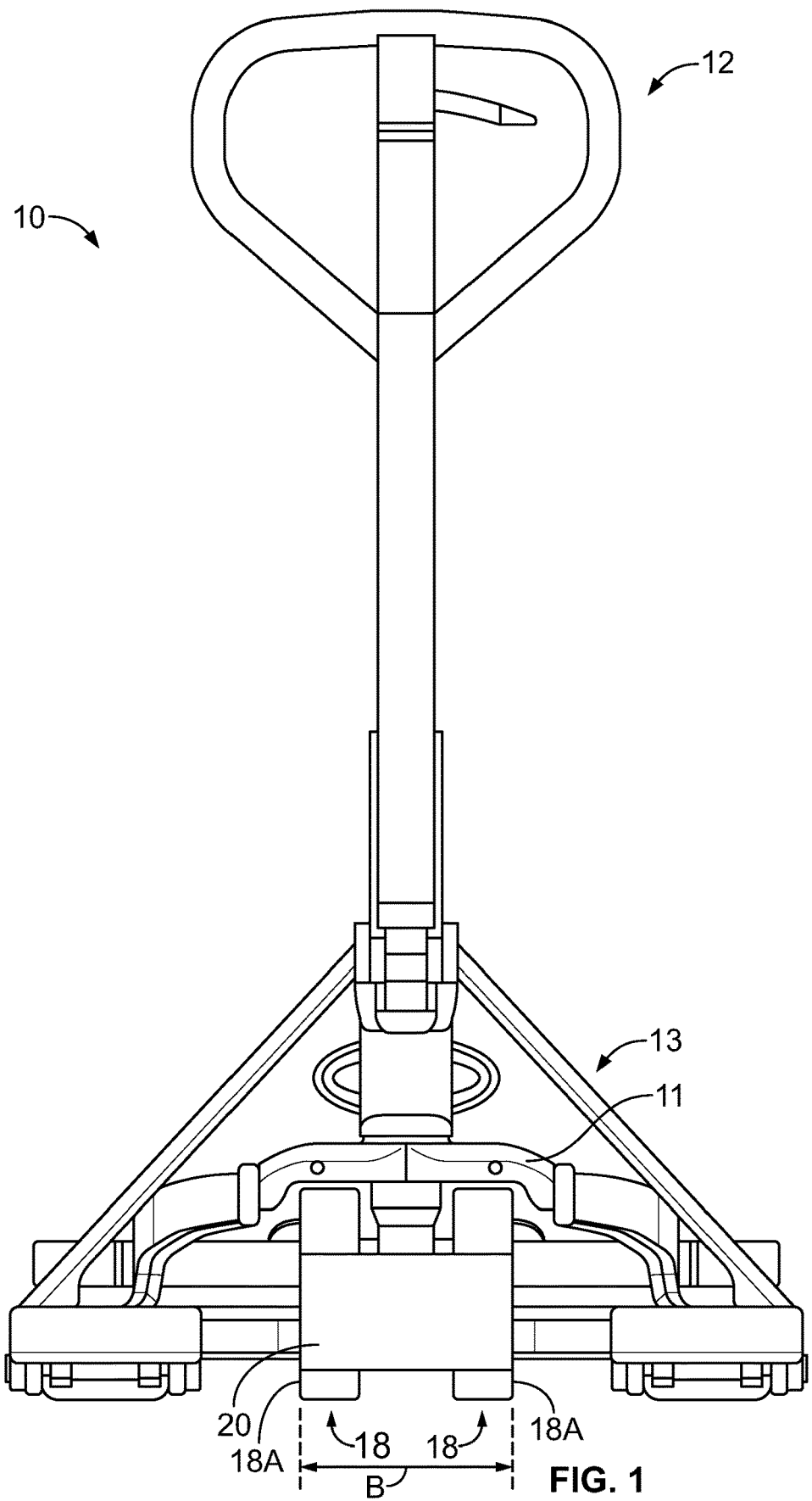
FIGS. 1 and 2 depict a material handling vehicle with a wheel guard according to one or more embodiments shown and described herein.
Figure 2:
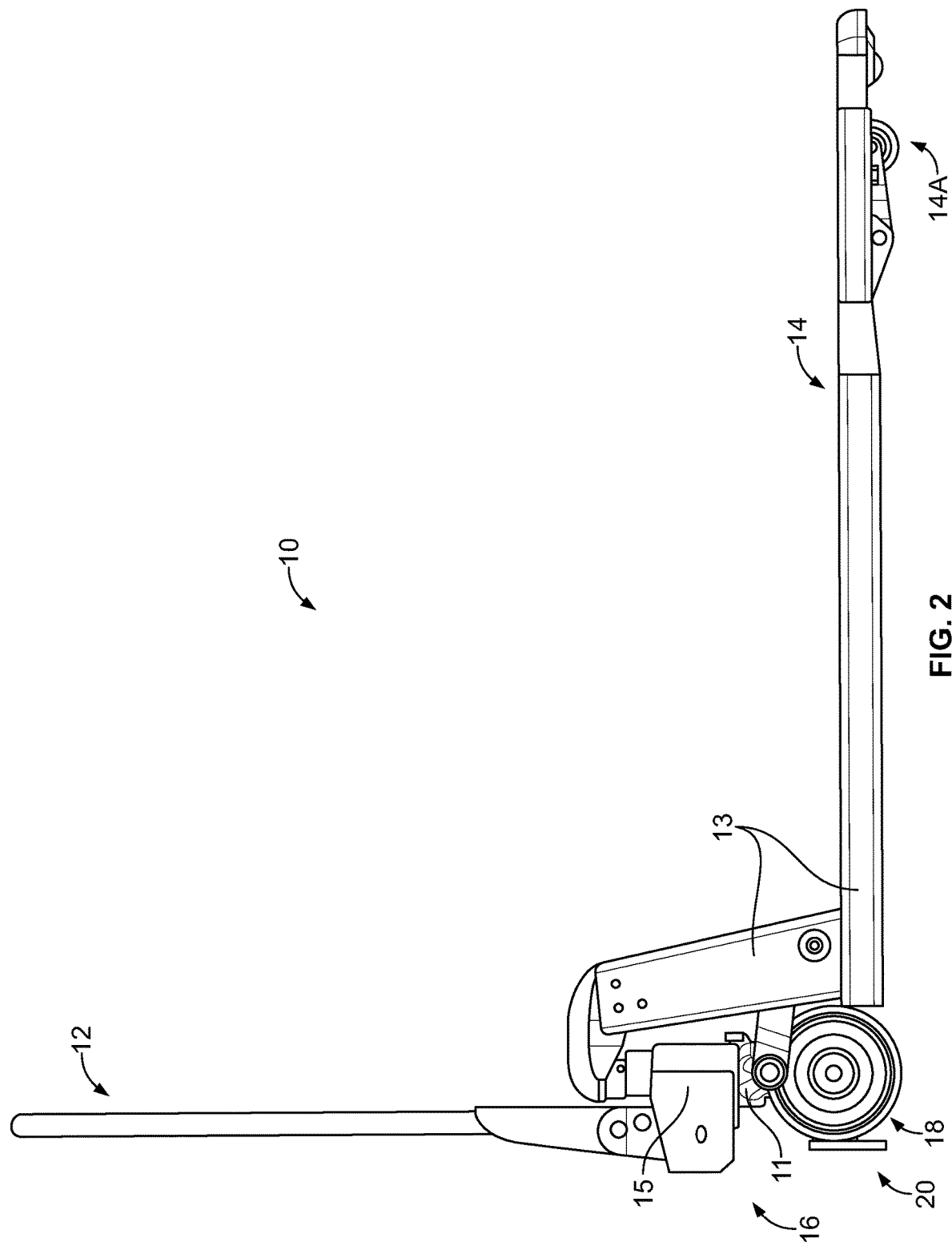
Figure 4:
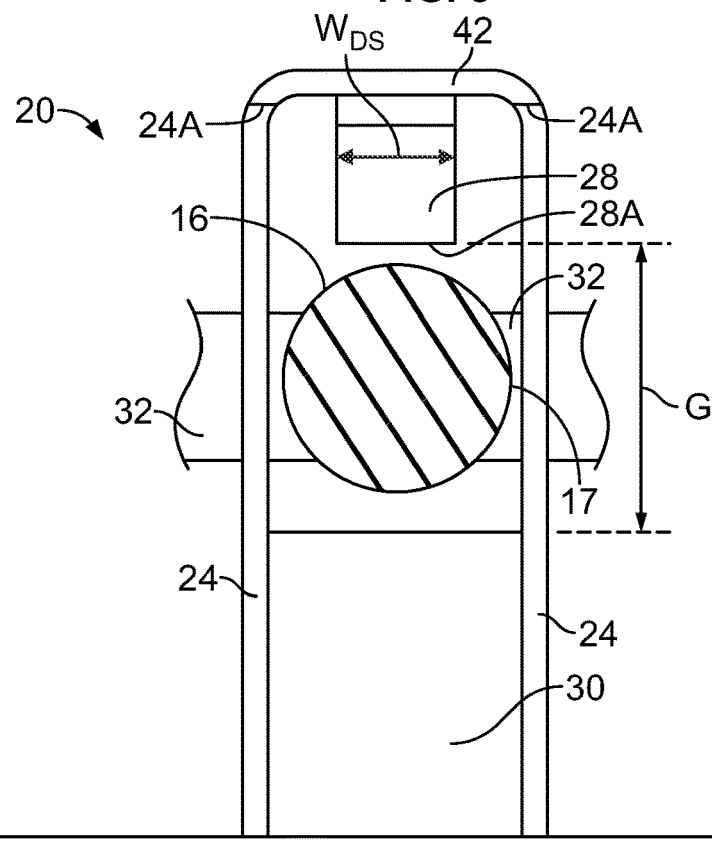
FIG. 4 is a top view of the wheel guard of FIG. 3.
Figure 5:
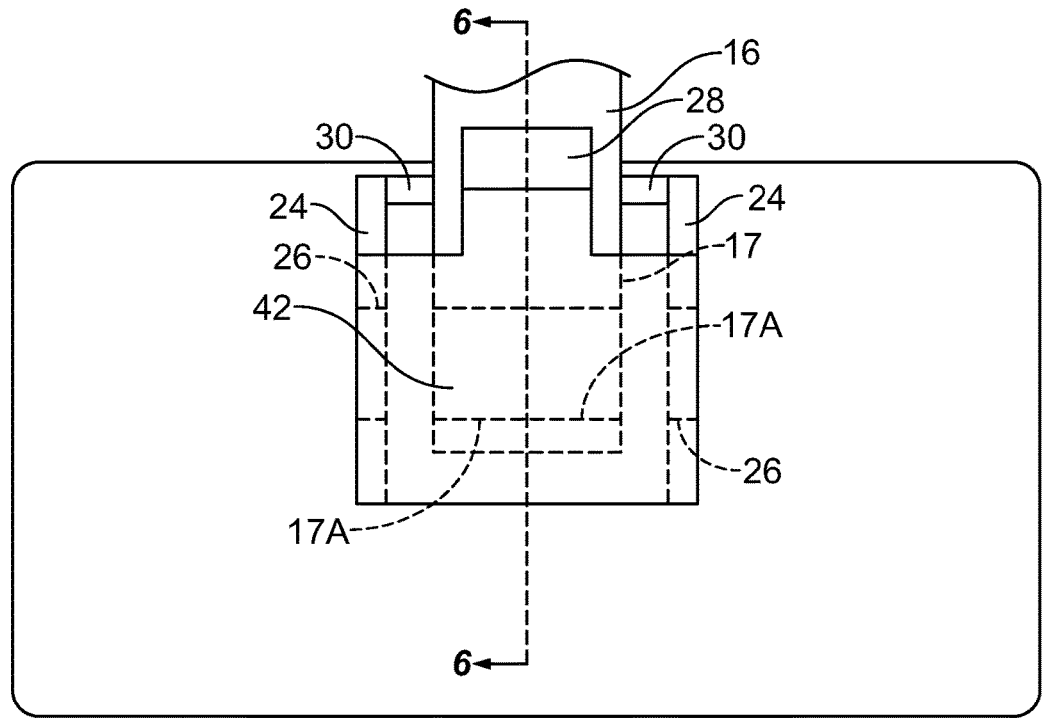
FIG. 5 is a rear view of the wheel guard of FIG. 3.
Figure 6:
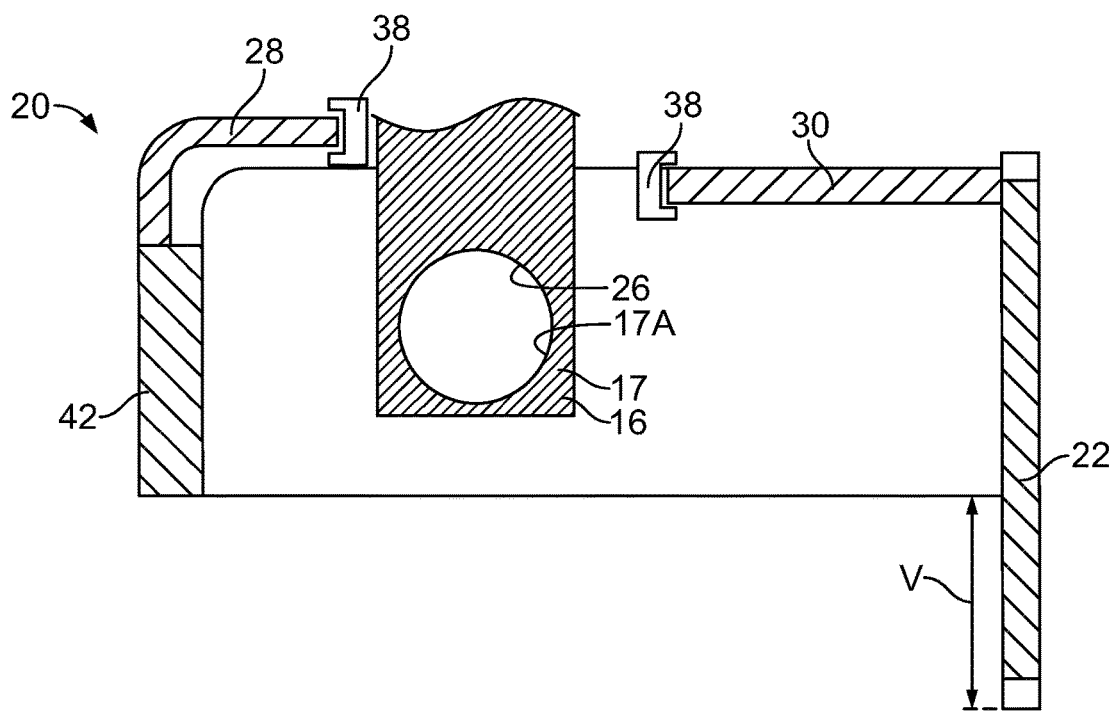
FIG. 6 is a sectional view of the wheel guard taken along view line 6-6 in FIG. 5 with length adaptors added.

Referring now to FIGS. 1 and 2, a material handling vehicle 10 comprising a pallet truck in the illustrated embodiment is shown with a traverse frame 11, a tiller handle 12, a lift structure 13 comprising one or more load forks 14, a pump 15 for raising and lowering the lift structure 13 relative to the traverse frame 11 and being activated by pivoting up and down the tiller handle 12, a steering assembly 16 coupled to the tiller handle 12, and one or more steer wheels 18. The one or more load forks 14 may comprise first and second load forks 14 spaced apart from one another. Each load fork 14 may comprise a pivotable load roller assembly 14A movable from a lowered position illustrated in FIG. 2 to a raised position (not illustrated) for moving a load. The steering assembly 16 may comprise a rotatable generally cylindrical steer body 17 having a bore 17A in a lower portion thereof through which an axle 32 extends, see FIGS. 4-6. With the axle 32 positioned in the steer body bore 17A, an axle bolt 33 passes through corresponding through-bores in the steer body 17, which through-bores may extend transversely to the bore 17A and extend to the bore 17A, such that the axle bolt 33 extends from a first side of the steer body 17 to an opposing side of the steer body 17, and further passes through a through-bore in the axle 32. A nut 34 is attached to the axle bolt 33 to secure the axle 32 to the steer body 17. The axle 32 may also extend through a bore in each of the one or more steer wheels 18. Bearings 45 are secured to the steer wheels 18 and positioned between the axle 32 and the steer wheels 18 to allow the steer wheels 18 to rotate relative to the axle 32. Each end of the axle 32 includes a circumferential groove or recess for receiving a snap ring 46 for engaging a corresponding one of the bearings 45 or the corresponding steer wheel 18 to axially secure the steer wheel 18 to the axle 32, i.e., to prevent the corresponding steer wheel 18 and bearing from axially moving off the axle 32, yet still allow the steer wheel 18 to rotate about the axle 32. The tiller handle 12 may be fixed to the steer body 17 to allow an operator to pivot or turn the steer body 17 and the one or more steer wheels 18 to steer the vehicle 10. In the illustrated embodiment, the diameter of the axle 32 where the through-bores for the axle bolt 33 are positioned is greater than the axle diameter where the steer wheels and bearings are located.

A wheel guard 20 may be coupled to the material handling vehicle 10 so as to be positioned behind the one or more steer wheels 18 to reduce the incidence of intrusion of foreign objects engaging the one or more steer wheels 18 by blocking or engaging an object to keep the object spaced from the one or more steer wheels 18 such that the object is not contacted or rolled over by the one or more steer wheels 18. Hence, the wheel guard 20 serves to block or engage an object to keep the object spaced from and being engaged by the one or more wheels 18 when the vehicle 10 is moving in a steer wheel first direction, thereby reducing the likelihood of the object being rolled over by the one or more steer wheels 18.

FIGS. 3, 4, 5, and 6 depict one embodiment of the wheel guard 20. The wheel guard 20 comprises a front plate 22 having a generally rectangular shape with a generally planar face 22B, wherein the front plate 22 defines a spade. The front plate 22 may comprise any other shape such as a square, rectangular, or elliptical shape. The wheel guard 20 further comprises one or more axle supports 24, each comprising an axle aperture 26. In the illustrated embodiment, the one or more axle supports 24 are defined by spaced apart first and second plates extending transverse to and fixed to the front plate 22, such as by welds, bolts or other connectors. The wheel guard 20 may still further comprise a back support 42 extending between and fixed, such as by welds, to ends 24A of the axle supports 24 opposite the ends of the axle supports 24 fixed to the front plate 22. A drop stop 28 may be integral with the back support 42 and extend to a location above and between the axle supports 24 or located within a space between the axle supports 24. The drop stop 28 may also be formed separate from the back support 42 but fixed to the back support 42 such as by a weld. It is also contemplated that with or without a back support being provided, the drop stop 28 may be coupled to one or both of the axle supports 24 instead of the back support. A raise stop 30 is also positioned between the axle supports 24 and may extend to the front plate 22. The raise stop 30 may by fixed to one or more of the front plate 22 or the axle supports 24. Each of the elements of the wheel guard 20 may be made from a metal or a polymeric material.

Figure 9:
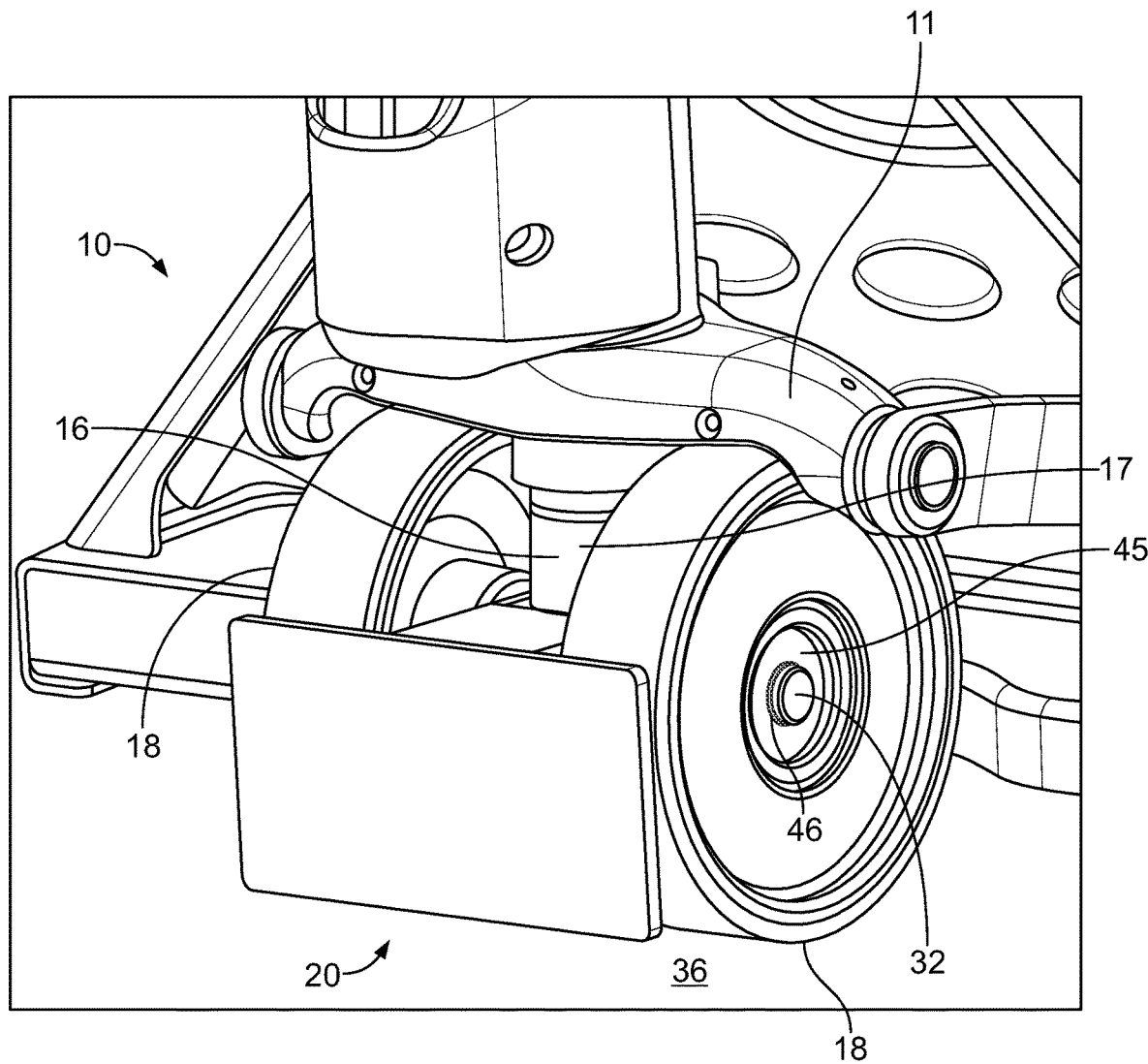
FIGS. 9-10 depict the material handling vehicle with the wheel guard according to one or more embodiments shown and described herein.
Figure 10:
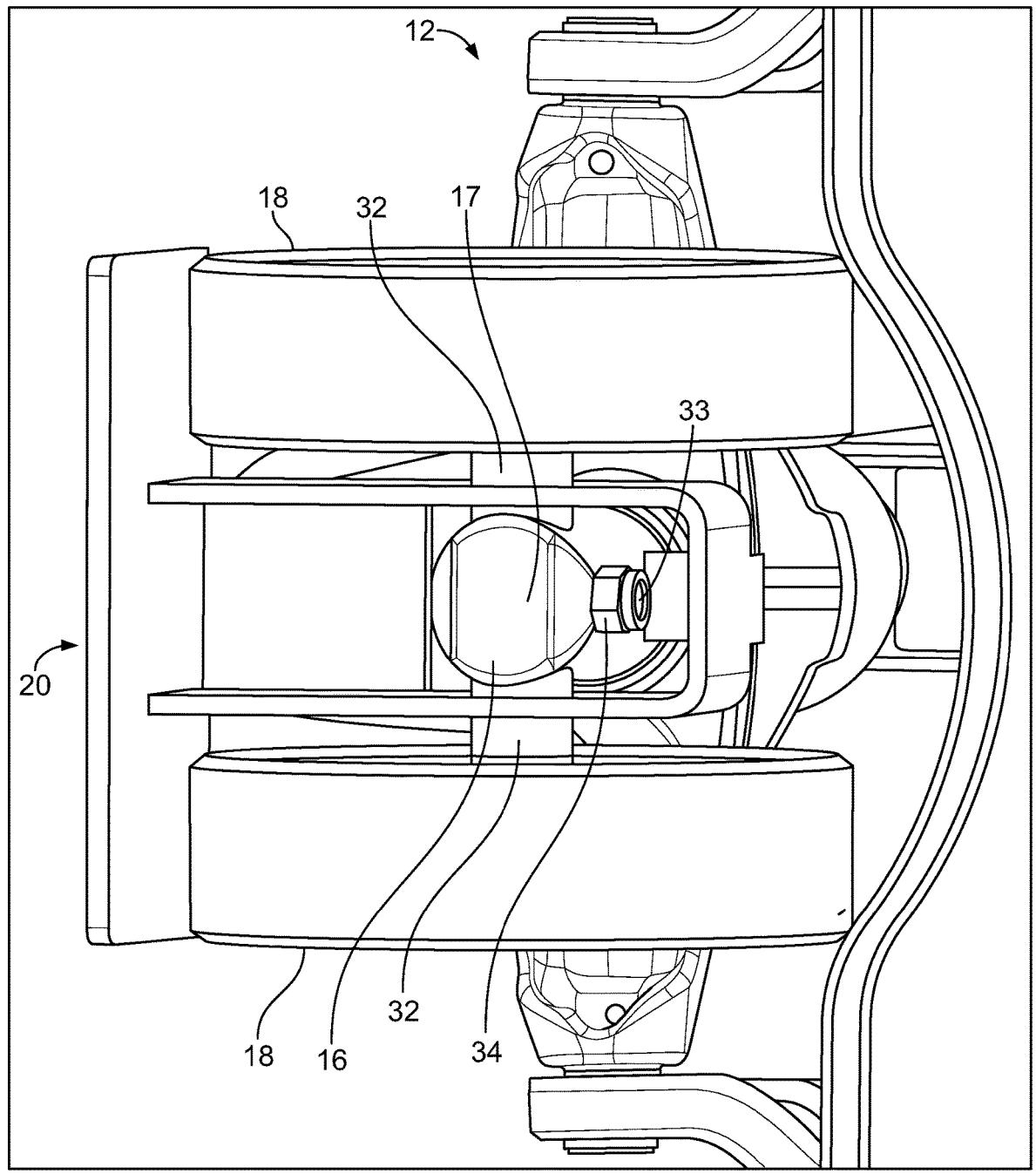

Referring now to FIGS. 9 and 10, the wheel guard 20 is shown installed on a material handling vehicle 10 with first and second steer wheels 18. To install the wheel guard 20, the snap rings 46 are first removed from the opposing ends of the axle 32. The steer wheels 18 and corresponding bearings 45 are then removed from the opposing ends of the axle 32. Thereafter, the nut 34 is removed from the axle bolt 33 and the axle bolt 33 is removed from the cylindrical steer body 17 and the axle 32. As noted above, the axle 32 extends through the bore 17A in the rotatable generally cylindrical steer body 17 of the steer assembly 16. Once the bolt 33 is removed from the steer body 17, the axle 32 is then removed from the steer body 17. After the axle 32 is removed from the bore 17A in the steer body 17, the wheel guard 20 is positioned such that the steer body 17 extends at least partially in between the axle supports 24 and the axle apertures 26 (FIG. 6) are in alignment with the bore 17A in the steer body 17 of the steering assembly 16. Thereafter, the axle 32 is inserted through the axle apertures 26 of the axle supports 24 and the bore 17A in the steer body 17. Then the axle bolt 33 is inserted through the through-bores in the steer body 17 and the axle 32. The nut 34 is coupled to the axle bolt 33 such that the axle 32 is secured to the steer body 17. Thereafter, the steer wheels 18 and corresponding bearings 45 are positioned on the opposite ends of the axle 32 and the snap rings 46 are secured in position on the opposing ends of the axle 32 to secure the steer wheels 18 axially on the axle 32. The wheel guard 20 is not fixed in position on the axle 32 but, rather, can rotate about the axle 32 as discussed further below. It is noted that the diameter of each axle aperture 26 in the axle supports 24 is slightly larger than the outer diameter of the axle 32.

Figure 3:
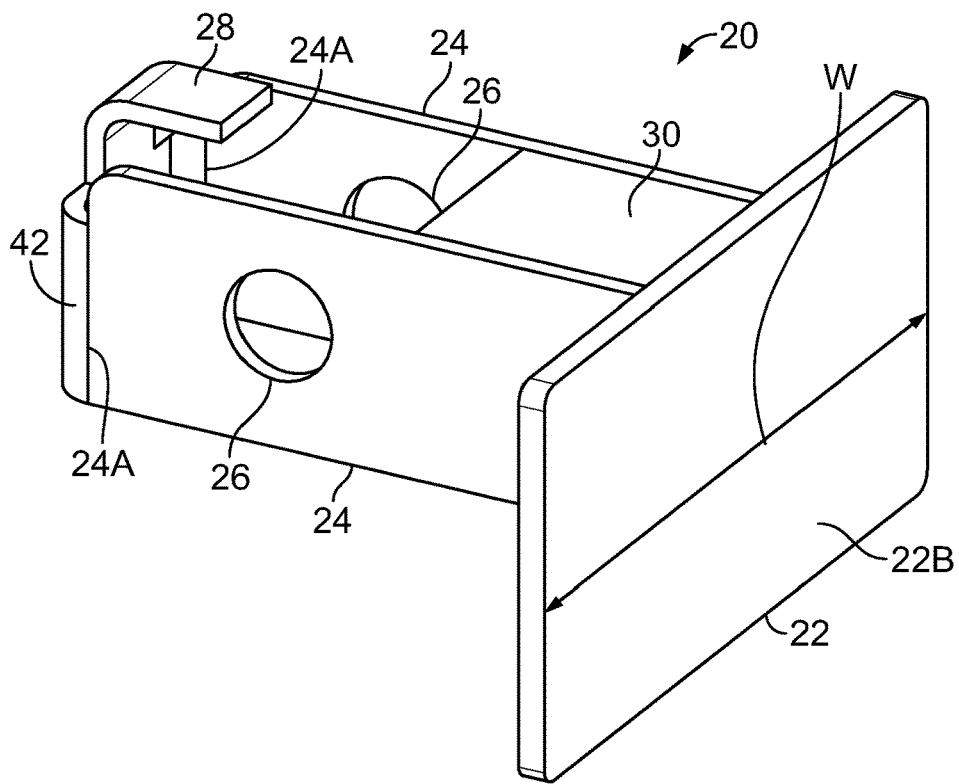
FIG. 3 is a perspective view of a wheel guard according to one embodiment.

The front plate 22 comprises a spade width W (FIG. 3). In one embodiment, the spade width W is about equal to the wheel width B (FIG. 1) of the one or more steer wheels 18 as measured from an outer edge 18A of one wheel 18 to an outer edge 18A of the other wheel 18. In another embodiment, the spade width W may be less than the wheel width B of the one or more wheels 18. Preferably, the spade W is equal to or less than the wheel width B so as to not limit the rotation of the steering assembly 16 around a steering axis A (FIG. 2). In other words, a spade width W that is greater than the wheel width B may promote contact between the wheel guard 20 with other parts of the material handling vehicle 10 and thus limit the rotation of the steering assembly 16 and steer wheels 18 about steering axis A to be less than what is intended or desired with the design of the material handling vehicle 10.

Figure 7:
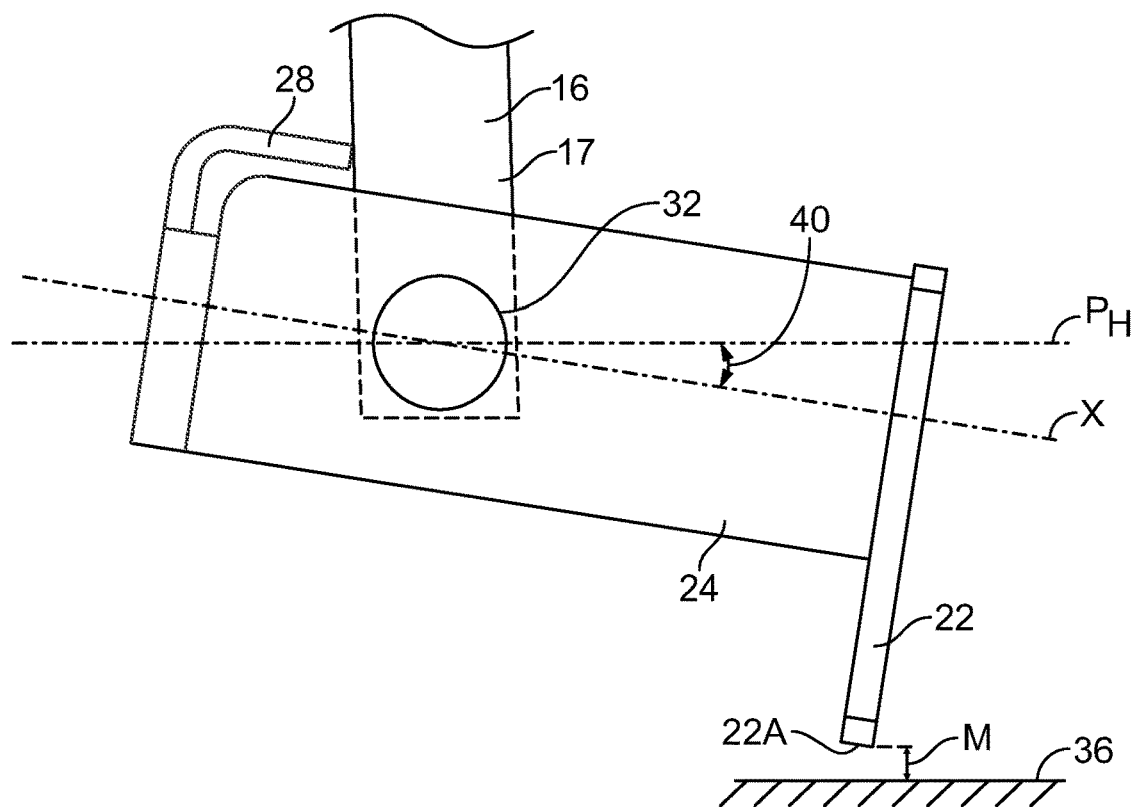
FIG. 7 is a side view of the wheel guard of FIG. 3 illustrated in its maximum clockwise position.
Figure 8:
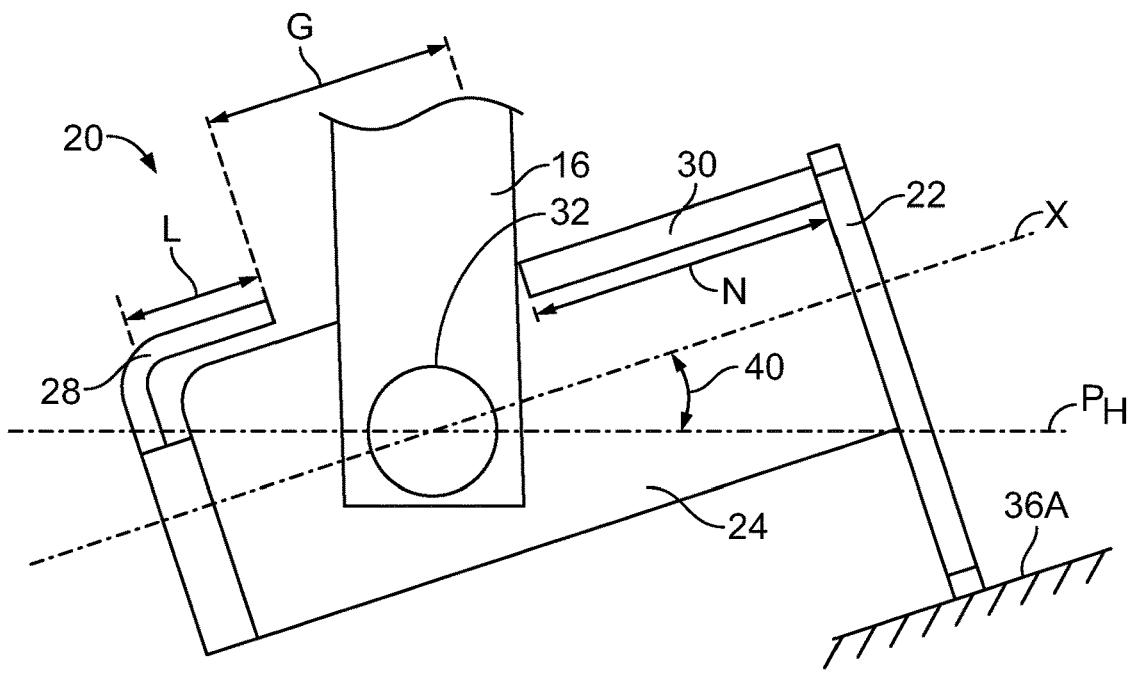
FIG. 8 is a side view of the wheel guard of FIG. 3 with one of its axle supports removed and illustrated in a maximum counter-clockwise position.

As noted above, the wheel guard 20 is rotatable about the axle 32. Referring now to FIGS. 7 and 8, the drop stop 28 and the raise stop 30 limit the amount of rotational movement of the wheel guard 20 about the axle 32 or a swing angle 40 of the wheel guard 20 about the axle 32. As illustrated in FIG. 8, the drop stop 28 may have a drop length L (also referred to herein as a first length), and the raise stop 30 may have a raise length N (also referred to herein as a second length). A gap G extends between the drop stop 28 and the raise stop 30 through which the steer body 17 extends and the gap G may have a length or dimension greater than the drop length L and less than the raise length N. When viewed from FIGS. 7 and 8, the drop stop 28, when it engages the steer body 17, limits a clockwise position of the wheel guard 20 relative to the steer body 17 and the raise stop 30, when it engages the steer body 17, limits a counter-clockwise position of the wheel guard 20 relative to the steer body 17. Hence, the drop length L defines a maximum clockwise position of wheel guard 20 relative to the steer body 17 or a horizontal plane $P_H$ and the raise length N defines the maximum counter-clockwise position of the wheel guard 20 relative to the steer body 17 or the horizontal plane $P_H$. The drop stop 28 also defines a spade height M, i.e., a distance a lower edge 22A of the front plate 22 is spaced from a surface 36 along which the vehicle 10 is travelling. Hence, the longer the drop length L, the greater the spade height M, i.e., the greater the front plate lower edge 22A is positioned above the floor surface 36 when the floor surface 36 is horizontal. The converse is true in that the shorter the drop length L, the spade height M is less when the floor surface 36 is horizontal. The drop length L may be selected to account for the type of floor surface 36 the vehicle 10 is intended to travel along. If the vehicle 10 is intended to be used on a floor surface 36 that is rough, uneven, or sloped, a greater spade height M may be desired so the wheel guard 20 is not routinely contacting the floor surface 36. If the vehicle 10 is intended to be used on a smooth, even, or flat floor surface 36, a smaller spade height M may be desired so that foreign objects are not easily allowed entry to the one or more steer wheels 18 situated forward of the wheel guard 20. It is noted that changing the drop length L changes the maximum swing angle 40 of the wheel guard 20 about the axle 32 in a first or clockwise direction, and changing the raise length N changes the maximum swing angle 40 of the wheel guard 20 about the axle 32 in a second or counter-clockwise direction.

When the vehicle 10 is positioned on a generally horizontal surface 36, see FIG. 7, the wheel guard 20, under its own weight, i.e., due to gravity acting on the guard 20, will rotate clockwise until the drop stop 28 engages the steer body 17. The swing angle 40 of the wheel guard 20 relative to the horizontal plane $P_H$, such as when the vehicle 10 is positioned on a generally horizontal surface 36 and the lower edge 22A of the front plate 22 is not in engagement with the surface 36, may fall within an angular range of from 0 degree to 15 degrees. When the vehicle 10 is moving in the steer wheel first direction up an inclined surface 36A (see FIG. 8), the lower edge 22A of the front plate 22 may engage the inclined surface 36A. The raise length N is defined to allow the wheel guard 20 to rotate about the axle 32 through a sufficient swing angle 40 in the second or the counter-clockwise direction a sufficient amount to avoid the steer wheels 18 from being raised in a direction away from the inclined surface 36A. Hence, when the vehicle 10 is moving up an inclined surface 36A, the raise length N of raise stop 30 is defined to allow the material handling vehicle 10 to traverse the inclined floor surface 36A without the wheel guard 20 binding on the floor surface 36A and/or the steer wheels 18 being raised off the surface 36A.

It is contemplated, in one embodiment, that the spade length V (FIG. 6) can be varied to adjust the spade height M to account for varying floor conditions as well. In other embodiments, one or more removable length adaptors 38 (FIG. 6) may also be fitted to either the drop stop 28, the raise stop 30, or both to adjust the length of the drop and raise stops 28 and 30 and hence, adjust the maximum angles of rotation of the wheel guard 20 about the axle 32. It is contemplated that the one or more adaptors 38 may be made from rubber or other material to reduce wear between the wheel guard 20 and the steering assembly 16 and reduce the metal on metal noise. In one embodiment, the one or more adaptors 38 may be a cap that fits over the drop stop 28 and/or raise stop 30. In one embodiment, the one or more adaptors 38 may be a strip of material that is coupled to the drop stop 28 and/or raise stop 30 with adhesive or mechanical fasteners. In the illustrated embodiment, the width $W_{DS}$ of the drop stop 28 may be less than the width of the back support 42 so as to allow the drop stop 28 to be more easily mechanically deformed, such as being hit by a hammer, to move a front edge 28A of the drop stop 28 closer to or further away from the raise stop 30, thereby changing the swing angle 40, see FIG. 7.

It is contemplated that the wheel guard 20 has freedom to move in the horizontal direction by changing the diameter of the axle apertures 26 in relation to the axle diameter. The closer in size the diameters are to one another, the less the horizontal movement is allowed in the wheel guard 20 relative to the axle 32 and conversely, the greater the size difference between the axle diameter and the axle aperture diameters, the greater the horizontal movement is allowed in the wheel guard 20. In one embodiment, the axle apertures 26 have a diameter or horizontal dimension greater than the diameter or horizontal dimension of the axle 32 to allow for movement of the wheel guard in the horizontal direction.

In one embodiment, the wheel guard 20 may only comprise the drop stop 28 or the raise stop 30, but not both. In one embodiment, the wheel guard 20 may not comprise either a separate drop stop 28 or raise stop 30. For these embodiments, the back support 42 (FIG. 6) may define the drop stop 28 and/or the front plate 22 may define the raise stop 30. In other words, the steering assembly 16 will contact the back support 42 to limit the rotation travel of the wheel guard 20 about the axle 32 and the steering assembly 16 will contact the front plate 22 to limit the rotation travel of the wheel guard 20 about the axle 32.

FIG. 9 generally depicts one embodiment of a wheel guard 20. The one-piece design of the wheel guard 20 does require additional mounting hardware such as bolts, chains, or adhesives to secure the wheel guard 20 to the material handling vehicle 10. The drop and raise stops allow for the wheel guard to reduce the incidence of intrusion of foreign objects between the wheels or the incidence of an object being rolled over by the one or more wheels 18 over different floor surfaces 36. The steering assembly 16 can be rotated about the steering axis A (FIG. 2) within the original design specifications of the material handling vehicle 10 with the wheel guard 20 attached. The wheel guard 20 does not impede the raising and lowering of the one or more forks 14 (FIG. 2).

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Certain terminology is used in the disclosure for convenience only and is not limiting. The words "left", "right", "front", "back", "upper", and "lower" designate directions in the drawings to which reference is made. The terminology includes the words noted above as well as derivatives thereof and words of similar import.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A wheel guard for use on a material handling vehicle comprising a steering assembly, an axle extending through the steering assembly and a steer wheel mounted on the axle, the wheel guard comprising:
   a front plate to be positioned adjacent to the steer wheel;
   an axle support coupled to and extending transverse to the front plate and comprising an axle aperture through which the vehicle axle is to be extended, the wheel guard to be rotatable about the axle; and
   a stop coupled to at least one of the front plate or the axle support to limit rotational movement of the wheel guard about the axle, the stop configured to be movable toward or away from the steering assembly when the wheel guard rotates about the axle.

2. The wheel guard of claim 1, wherein the axle support comprises a first axle support and further comprising a second axle support, the first and second axle supports being spaced apart from one another and coupled to the front plate.

3. The wheel guard of claim 2, further comprising a back support coupled the first and second axle supports at locations on the first and second axle supports opposite to locations where the first and second axle supports are coupled to the front plate.

4. The wheel guard of claim 3, wherein the stop comprises a first stop coupled to the back support to limit rotational movement of the wheel guard about the vehicle axle in a first direction.

5. The wheel guard of claim 4, further comprising a second stop coupled to at least one of the front plate or the first and second axle supports and spaced from the first stop, the second stop to limit rotational movement of the wheel guard about the vehicle axle in a second direction opposite to the first direction.

6. The wheel guard of claim 5, wherein the first stop has a first length and the second stop has a second length, and wherein a gap between the first and second stops has a length greater than the first length and less than the second length.

7. The wheel guard of claim 5, wherein at least one of the first or the second stop comprises a removable length adapter.

8. The wheel guard of claim 1, wherein the wheel guard is rotatable about the axle while the material handling vehicle is in motion.

9. The wheel guard of claim 1, wherein the front plate is moveable toward or away from a surface along which the vehicle travels as the wheel guard rotates about the axle.

10. A combination comprising:
    a material handling vehicle comprising:
      a steering assembly;
      an axle extending through the steering assembly;
      a steer wheel mounted on the axle; and
      a wheel guard comprising:
        a front plate located adjacent to the steer wheel;
        an axle support coupled to and extending transverse to the front plate and comprising an axle aperture through which the axle extends, the wheel guard being rotatable about the axle; and
        a stop coupled to at least one of the front plate or the axle support to limit rotational movement of the wheel guard about the axle, the stop configured to be movable toward or away from the steering assembly when the wheel guard rotates about the axle.

11. The combination of claim 10, wherein the axle support comprises a first axle support and further comprising a second axle support, the first and second axle supports being spaced apart from one another and coupled to the front plate.

12. The combination of claim 11, further comprising a back support coupled to the first and second axle supports at locations on the first and second axle supports opposite to locations where the first and second axle supports are coupled to the front plate.

13. The combination of claim 12, wherein the stop comprises a first stop coupled to the back support and limiting rotational movement of the wheel guard about the vehicle axle in a first direction.

14. The combination of claim 13, further comprising a second stop coupled to at least one of the front plate or the first and second axle supports and spaced from the first stop, the second stop limiting rotational movement of the wheel guard about the vehicle axle in a second direction opposite to the first direction.

15. The combination of claim 14, wherein the first stop has a first length and the second stop has a second length, and wherein a gap between the first and second stops has a length greater than the first length and less than the second length.

16. The combination of claim 14, wherein at least one of the first or the second stop comprises a removable length adapter.

17. The combination of claim 10, wherein the steer wheel comprises a first steer wheel and further comprising a second steer wheel, the first and second steer wheels being spaced apart on the axle.

18. The combination of claim 17, wherein a width of the front plate is equal to or less than a width of the first and second steer wheels extending from an outer edge of the first steer wheel to an outer edge of the second steer wheel.

19. The combination of claim 10, wherein the wheel guard is rotatable about the axle while the material handling vehicle is in motion.

20. The wheel guard of claim 10, wherein the front plate is moveable toward or away from a surface along which the vehicle travels as the wheel guard rotates about the axle.

21. A wheel guard for use on a material handling vehicle comprising a steering assembly, an axle extending through the steering assembly and first and second steer wheels mounted on the axle, the wheel guard comprising:
- a front plate to be positioned adjacent to the steer wheel; and
- an axle support coupled to and extending transverse to the front plate and comprising an axle aperture through which the vehicle axle is to be extended;
- wherein a width of the front plate is less than a width of the first and second steer wheels extending from an outer edge of the first steer wheel to an outer edge of the second steer wheel.

* * * * *